United States Patent
Adachi et al.

[11] Patent Number: 6,055,474
[45] Date of Patent: Apr. 25, 2000

[54] SPEED CHANGE RATIO CONTROLLER FOR CONTINUOUSLY VARIABLE TRANSMISSION

[75] Inventors: Kazutaka Adachi, Yokohama; Hiroyuki Ashizawa, Fujisawa, both of Japan

[73] Assignee: Nissan Motor Co., Ltd., Yokohama, Japan

[21] Appl. No.: 09/056,744

[22] Filed: Apr. 8, 1998

[51] Int. Cl.[7] .................................................. B60K 41/04
[52] U.S. Cl. .............................................................. 701/51
[58] Field of Search .................................. 701/54, 55, 51, 701/61, 65, 66; 477/37, 46, 48, 53, 68; 474/18, 69

[56] References Cited

U.S. PATENT DOCUMENTS

| | | | |
|---|---|---|---|
| 4,683,779 | 8/1987 | Osanai et al. | 477/43 |
| 4,778,435 | 10/1988 | Sugaya et al. | 474/28 |
| 5,628,705 | 5/1997 | Kashiwabara | 477/46 |

*Primary Examiner*—Tan Nguyen
*Attorney, Agent, or Firm*—Foley & Lardner

[57] ABSTRACT

A target speed change ratio of a continuously variable transmission of a vehicle is set according to the running state of the vehicle. Dynamic characteristics of the continuously variable transmission are estimated for each speed change ratio, and a speed change ratio output value is calculated based on the dynamic characteristics. An external disturbance compensating value is computed from a speed change ratio command value, the real speed change ratio, the dynamic characteristic estimated value and a predetermined time constant, and the transmission is controlled by the speed change ratio command value based on the speed change ratio output value and external disturbance compensating value. By applying the lesser of a temporary target speed change ratio having predetermined characteristics and the target speed change ratio to the calculation of the speed change ratio output value when the vehicle speed is equal to or greater than a predetermined value, a dimensional error in parts is compensated and smooth speed change control is realized when the vehicle starts.

9 Claims, 10 Drawing Sheets

SPEED CHANGE RATIO CONTROLLER FOR CONTINUOUSLY VARIABLE TRANSMISSION

The contents of Tokugan Hei 9-89496, with a filing date of Apr. 8, 1997 in Japan, are hereby incorporated by reference.

FIELD OF THE INVENTION

This invention relates to speed change ratio control of a continuously variable transmission.

BACKGROUND OF THE INVENTION

A continuously variable transmission for a vehicle is provided for example with a hydraulic transmission such as a torque-converter or a fluid coupling which transmits the engine rotation power, and a continuously variable transmission (referred to hereafter as CVT) which varies the rotation speed of the hydraulic transmission and transmits it to a vehicle drive shaft.

In Tokkai Sho 61-105353 published by the Japanese Patent Office in 1986, a CVT is disclosed wherein the speed change ratio is continuously varied by looping a belt around a drive pulley and driven pulley respectively comprising a V-shaped groove and varying the width of the pulley groove.

Oil pressure acts on each of these pulleys via a speed change control valve, and the width of the pulley is varied according to the oil pressure. In other words, the speed change ratio is varied by controlling the speed change control valve.

This oil pressure is supplied to the speed change control valve via a line pressure control valve from an oil pump driven by the engine. The speed change control valve comprises a spool valve connected to a step motor via a link. When the link displaces the spool according to an angular position of the step motor, the oil pressure acting on the pulley varies.

The speed change control valve for example simply transmits pressure from the oil pump to the driven pulley, only the oil pressure acting on the drive pulley being controlled according to a speed change ratio command signal. In this case, the higher the pressure acting on the drive pulley, the narrower is the groove width of the drive pulley, the larger is the contact radius between the drive pulley and the belt, and the smaller is the speed change ratio. When the pressure acting on the drive pulley is 0, the contact radius between the drive pulley and belt is a minimum and the speed change ratio is a maximum. When the vehicle is started, the oil pressure acting on the drive pulley is controlled to increase together with the rise of engine rotation speed, and the speed change ratio gradually decreases.

The step motor varies its angular position according to a speed change ratio command signal output from the control unit, and the spool of the speed change control valve is displaced via the link. The control unit calculates a target speed change ratio so that the engine rotation speed corresponds to a depression of an accelerator pedal, and outputs a corresponding speed change ratio command signal to the speed change control valve.

The displacement of this link is limited by a stopper at its maximum displacement position which corresponds to the valve position at which the valve releases the whole pressure acting on the drive pulley to a drain. The starting point for the angular position change of the step motor is set so that it overshoots an angular position at which the link comes in contact with the stopper, or an angular position at which the oil pressure acting on the drive pulley is completely opened to the drain, by a plurality of steps in the direction of increasing speed change ratio. When the vehicle is at rest, the step motor is held in this starting point position. The reason for performing this setting is that, if oil pressure were to act continuously on the drive pulley in the rest state, there would be an undesirable effect on the durability of the CVT.

Therefore, when the vehicle starts, an "initialization" must be performed wherein the step motor is rotated from this starting point to a true control starting position at which the speed change control valve actually begins speed change control. This task is performed when the control unit outputs a speed change ratio command signal for initialization.

However, due to scatter in the dimensions of mechanical parts which are interposed between output of the speed change ratio control signal and variation of groove width of the drive pulley, the step number of the step motor required for initialization is not necessarily the same for all transmission systems of the same specification. The case therefore arises where the angular position of the step motor may not coincide with the control start position even if initialization completes. When the angular position of the step motor does not reach the control start position, the response delay of the transmission increases during the accelerating process of the vehicle when it is started. This response delay adversely affects the acceleration performance of the vehicle. Conversely, when the angular position of the step motor has overshot the control start position, the vehicle starts with a speed change ratio which is smaller than the command value. Such a smaller speed change ratio also affects the acceleration performance of the vehicle.

The above initialization errors may also cause the real speed change ratio to overshoot the target speed change ratio during the acceleration after the vehicle is started.

SUMMARY OF THE INVENTION

It is therefore an object of this invention to compensate dimensional scatter in the production of mechanical parts, and to make speed change control of a vehicle smoother when the vehicle starts.

In order to achieve the above object, this invention provides a speed change ratio controller for such a continuously variable transmission which continuously vary a rotation speed of an engine of a vehicle via an actuator and transmits a varied rotation to a vehicle drive shaft.

The controller comprises a sensor for detecting a running state of the vehicle, a sensor for detecting a real speed change ratio of the transmission, a sensor for detecting a vehicle speed, and a microprocessor.

The microprocessor is programmed to set a target speed change ratio from the running state, set a temporary target speed change ratio smaller than a largest speed change ratio of the transmission, compute a dynamic characteristic estimated value of the continuously variable transmission for each speed change ratio, calculate a speed change ratio output value based on the dynamic characteristic estimated value and the lesser of the target speed change ratio and the temporary target speed change ratio when the vehicle speed is equal to or greater than a predetermined speed, compute an external disturbance compensating value under a predetermined time constant based on a speed change ratio command value, the real speed change ratio and the dynamic characteristic estimated value, calculate the speed change ratio command value based on the speed change ratio output value and the external disturbance compensating value, compute an operating command value of the actuator according to the speed change ratio command value, and control the actuator based on the operating command value.

It is preferable that the microprocessor is further programmed to set the target speed change ratio to the largest speed change ratio when the operating command value is less than a predetermined first reference value, and set the temporary target speed change ratio so that the temporary target speed change ratio gradually decreases as the operating command value increases when the operating command value is equal to or larger than the predetermined first reference value.

It is further preferable that the microprocessor is further programmed to set the temporary target speed change ratio to be equal to the largest speed change ratio when the vehicle speed is lower than the predetermined speed.

It is also preferable that the microprocessor is further programmed to set the temporary target speed change ratio to gradually decrease from the largest speed change ratio as the operating command value increases, when the vehicle speed is equal to or greater than the predetermined speed.

In this case, it is further preferable that the microprocessor is further programmed to set temporary target speed change ratio to be equal to the target speed change ratio when the operating command value is equal to or greater than a predetermined second reference value which is larger than the first predetermined reference value.

It is also preferable that the microprocessor is further programmed to compute a different operating command value when the speed change ratio is increasing and when the speed change ratio is decreasing.

According to another aspect of this invention, the microprocessor is programmed to set a target speed change ratio from the running state, compute a dynamic characteristic estimated value of the continuously variable transmission for each speed change ratio, calculate a speed change ratio output value based on the dynamic characteristic estimated value so that the real speed change ratio follows the target speed change ratio, determine whether or not the vehicle speed is within a predetermined speed range, set a time constant which has a larger value when the vehicle speed is within the predetermined speed range than when the vehicle speed is out of the predetermined speed range, compute an external disturbance compensating value under the time constant based on a speed change ratio command value, the real speed change ratio and the dynamic characteristic estimated value, calculate the speed change ratio command value based on the speed change ratio output value and the external disturbance compensating value, compute an operating command value of the actuator according to the speed change ratio command value, and control the actuator based on the operating command value.

It is preferable that the predetermined speed range is set from 5 km/hr to 10 km/hr.

The details as well as other features and advantages of this invention are set forth in the remainder of the specification and are shown in the accompanying drawings.

DESCRIPTION OF THE PREFERRED EMBODIMENTS

Figure 1:
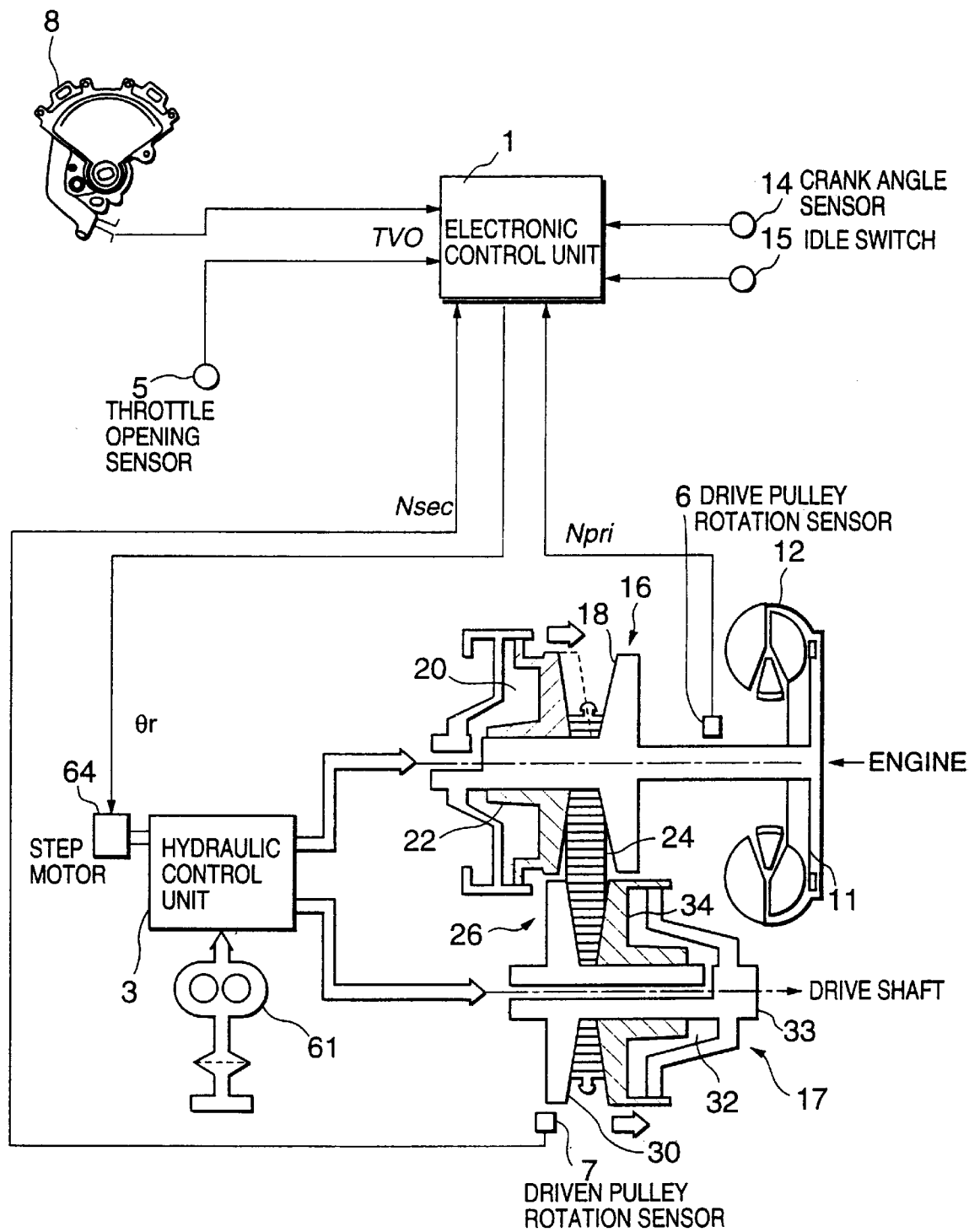
FIG. 1 is a schematic diagram of a continuously variable transmission and a speed change ratio controller according to this invention.

Referring to FIG. 1 of the drawings, a continuously variable transmission (CVT) 17 is connected to an engine, not illustrated, via a torque converter 12 comprising a lock up clutch 11. The CVT 17 comprises a drive pulley 16 which is connected to a torque-converter 12, and a driven pulley 26 which is connected to an output shaft 33. A V-belt 24 is looped around these pulleys 16 and 26.

The drive pulley 16 comprises a fixed conical plate 18 which rotates together with the torque-converter 12 and a movable conical plate 22 facing the fixed conical plate 18, a V-shaped pulley groove being formed between these conical plates 18 and 22. The movable conical plate 22 is displaced according to an oil pressure supplied to a drive pulley cylinder chamber 20, i.e. the drive pulley oil pressure, in the direction of the pulley shaft.

The driven pulley 26 comprises the fixed conical plate 30 which rotates together with a pulley shaft 33, and a movable conical plate 34 arranged facing the fixed conical plate 30, a V-shaped pulley groove being formed between these conical plates 30 and 34. The movable conical plate 34 is displaced according to a line pressure supplied to a driven pulley cylinder chamber 32, i.e. according to a driven pulley pressure, in the direction of the pulley shaft. The movable conical plate 34 has a larger pressure-receiving area than the movable conical plate 22.

A drive torque input from an engine is input to the drive pulley 16 of the CVT 17 via the torque-converter 12, and is transmitted to the driven pulley 26 via the V-belt 24 from the drive pulley 16.

When the movable conical plate 22 of the drive pulley 16 and the movable conical plate 34 of the driven pulley 26 are respectively displaced in the shaft direction, the contact radii between the V belt 24 and each pulley change, and a rotation speed ratio between the drive pulley 16 and driven pulley 26, i.e. a speed change ratio, can therefore be changed.

For example, if the width of the V-shaped groove of the drive pulley 16 is reduced, the contact radius between the drive pulley 16 and V-belt 24 becomes large, and the rotation speed of the output shaft increases. Conversely, if the width of the V-shaped groove of the drive pulley 16 is increased, the contact radius between the drive pulley 16 and V-belt 24 becomes small, and the rotation speed of the output shaft drops.

The speed change ratio of the CVT 17 and a contact frictional force between the V-belt 24 and conical plates are controlled by an oil pressure control unit 3.

Figure 2:
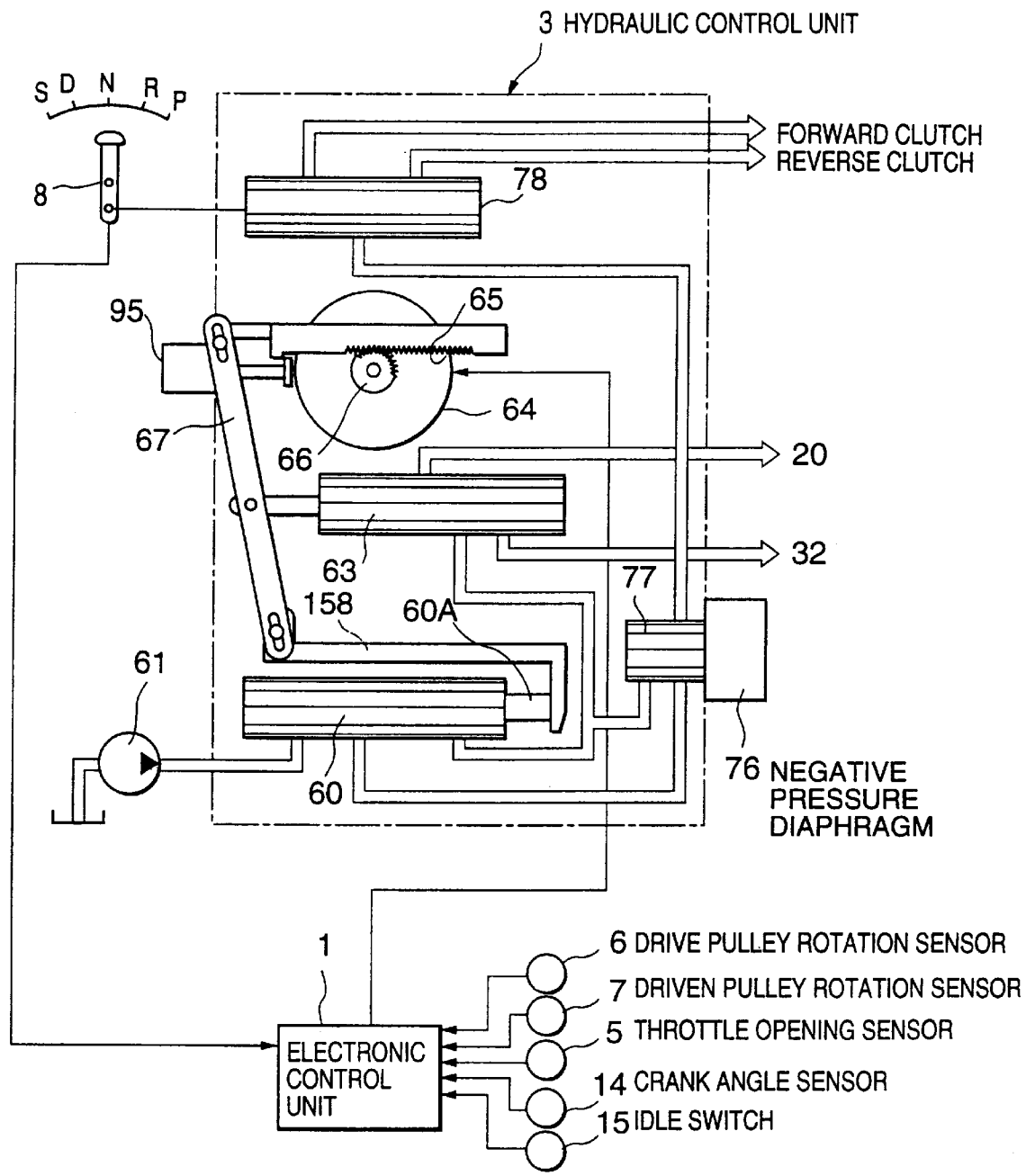
FIG. 2 is a schematic diagram of an oil pressure control unit according to this invention.

The oil pressure control unit 3, as shown in FIG. 2, is provided with a speed control valve 63 of the spool type, a step motor 64 which displaces the spool of the speed control valve 63 according to a target speed change ratio calculated by an electronic control unit 1 and a line pressure control-valve 60 for controlling a line pressure introduced from an oil pump 61.

The line pressure control valve 60 adjusts line pressure according to a pilot pressure supplied from a spool valve 77 in response to a negative pressure diaphragm 76 which detects an intake negative pressure of the engine.

The line pressure adjusted by the line pressure control valve 60 is supplied to the speed change control valve 63, and line pressure is also supplied to the spool valve 77 as a source of pilot pressure generated by the spool valve 77. The pilot pressure of the spool valve 77 is supplied as a forward/reverse clutch tightening pressure of a clutch via a manual valve 78 in response to a shift lever.

The structure of this line pressure control is known for example from Tokkai Hei 2-240438 published by the Japanese Patent Office in 1990.

A rotation speed signal from a drive pulley rotation speed sensor 6 which detects a rotation speed Npri of the drive pulley 16 of CVT 17, i.e. the input rotation speed to the CVT 17, and a rotation speed signal Nsec of the driven pulley 26, i.e. a rotation speed signal from a driven pulley rotation speed sensor 7 which detects the output rotation speed of the CVT 17, are input to the electronic control unit 1. The rotation speed signal from the driven pulley 26 is also used as a vehicle speed VSP.

Also input are signals showing the drive state of the vehicle, i.e. a shift position signal from an inhibitor switch 8 for detecting the shift position of a shift lever, a throttle opening signal TVO from a throttle opening sensor 5 according to a driver's accelerator pedal depression amount, a rotation speed signal Ne of the engine from a crank angle sensor 14, and an idle signal from an idle switch 15. A sensor detecting the accelerator depression amount directly can also be used instead of the throttle opening sensor 5.

Based on these signals, the electronic control unit 1 controls a speed change ratio according to the drive state and the driver's needs.

The control of speed change ratio is performed by controlling the oil pressure supplied to the drive pulley cylinder chamber 20. When the oil pressure supplied to the drive pulley cylinder chamber 20 rises, the speed change ratio varies in the direction in which the output rotation increases, and when this oil pressure drops, the speed change ratio varies in the direction in which the output rotation decreases. This control is performed by a signal output to the step motor 64 which drives the speed control valve 63 of the oil pressure control unit 3 from the control unit 1. The oil pressure of a cylinder chamber 32 of the driven pulley 26 is also supplied through the control valve 63, but this oil pressure is always maintained equal to the line pressure.

The step motor 64 displaces the spool of the speed change control valve 63 via a pinion 66, rack 65 and speed change link 67 according to an angular position command value θr from the electronic control unit 1. Displacement of the speed change link 67 is limited to a fixed range by a stopper 95. The spool selectively connects line pressure supplied from the line pressure control valve 60 or a drain to the pulley cylinder chamber 20 according to this displacement position. A rod 60A, which moves in synchronism with the spool of the line pressure control-valve 60, is joined to one end of the speed change link 67 via a feedback member 158. Due to this, line pressure is fed back to the spool position of the speed change control valve 3. The position of the movable conical plate 34 of the driven pulley 26 varies with the line pressure, so feeding back of the line pressure means feeding back the position of the movable conical plate 34 to the speed change control valve 63.

The speed change control valve 63 increases supply oil pressure to the cylinder chamber 20 of drive pulley 16 by displacing the rack 65 to the left of FIG. 2, and the CVT output speed is thereby varied towards higher speed. The oil pressure of the cylinder chamber 20 is reduced by displacement to the right of the figure so as to vary the CVT output speed towards lower speed.

Figure 5:
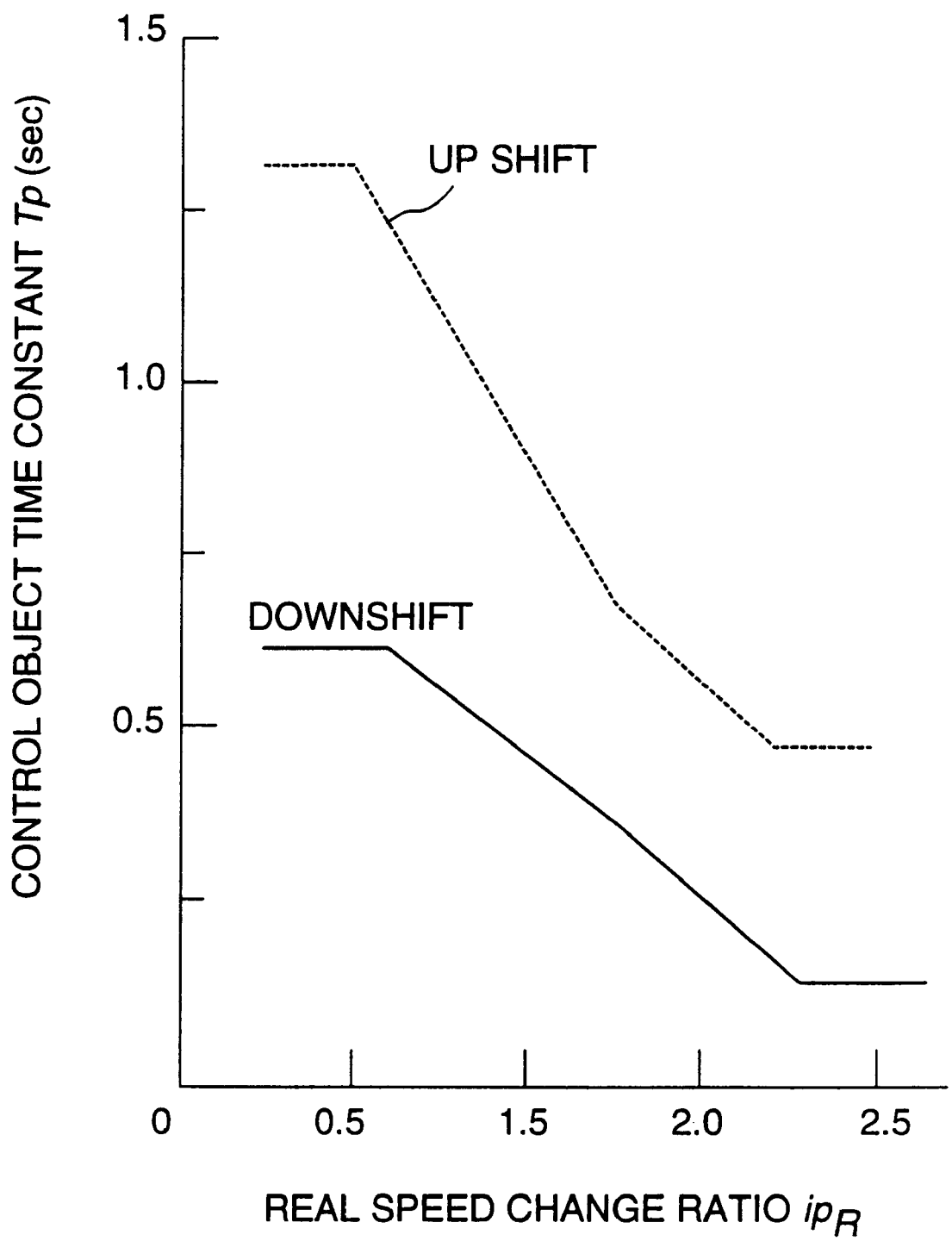
FIG. 5 is a diagram showing the contents of a map of a time constant Tp of a CVT stored in the electronic control unit.
Figure 6:
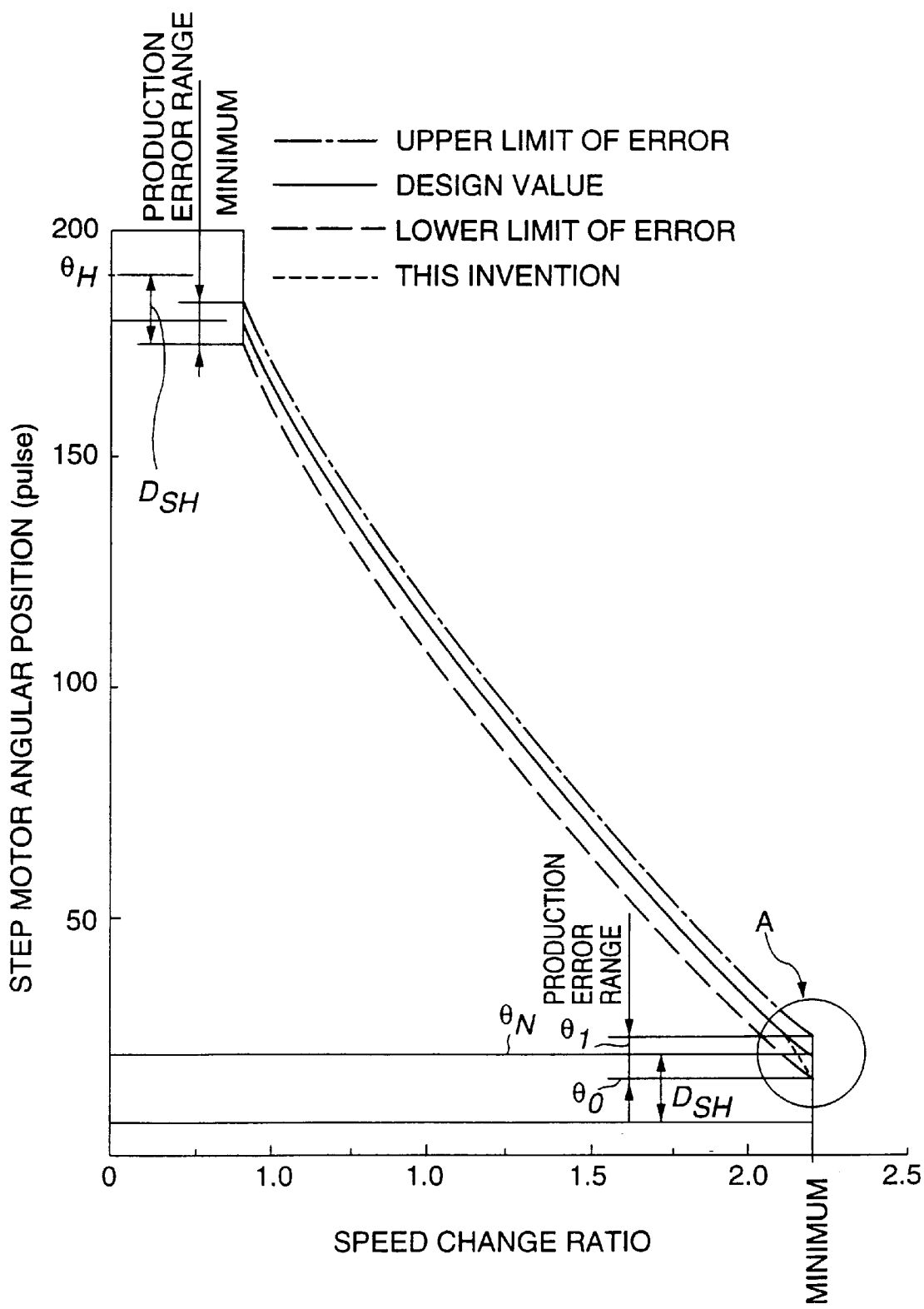
FIG. 6 is a diagram showing a relation between a speed change ratio and step motor angular position θ.

The control characteristics of line pressure PL due to the line pressure control valve 60 are shown in FIG. 5. Instead of the throttle valve 77 which responds to the negative pressure diaphragm 76, the line pressure control valve 60 be driven according to the accelerator pedal depression amount or throttle opening.

The structure of the speed change control valve 63 and the feedback of line pressure to the speed change control valve 63 are known from the aforementioned Tokkai Hei 2-240438.

The speed change ratio control performed by an electronic control unit 1 will now be described referring to the block diagram of FIG. 3 and the flowchart of FIGS. 4A and 4B.

Figure 3:
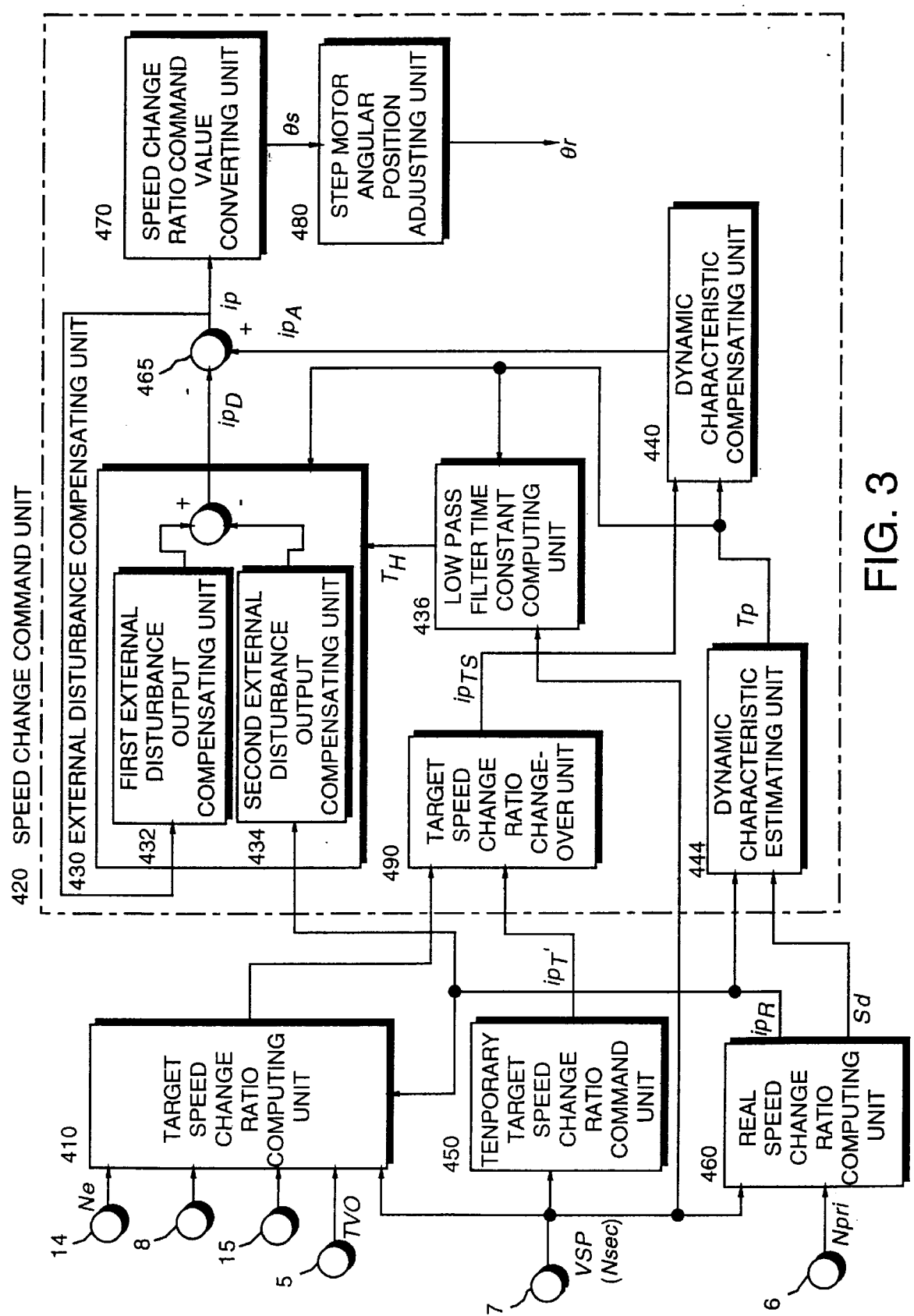
FIG. 3 is a block diagram of an electronic control unit according to this invention.
Figure 4A:
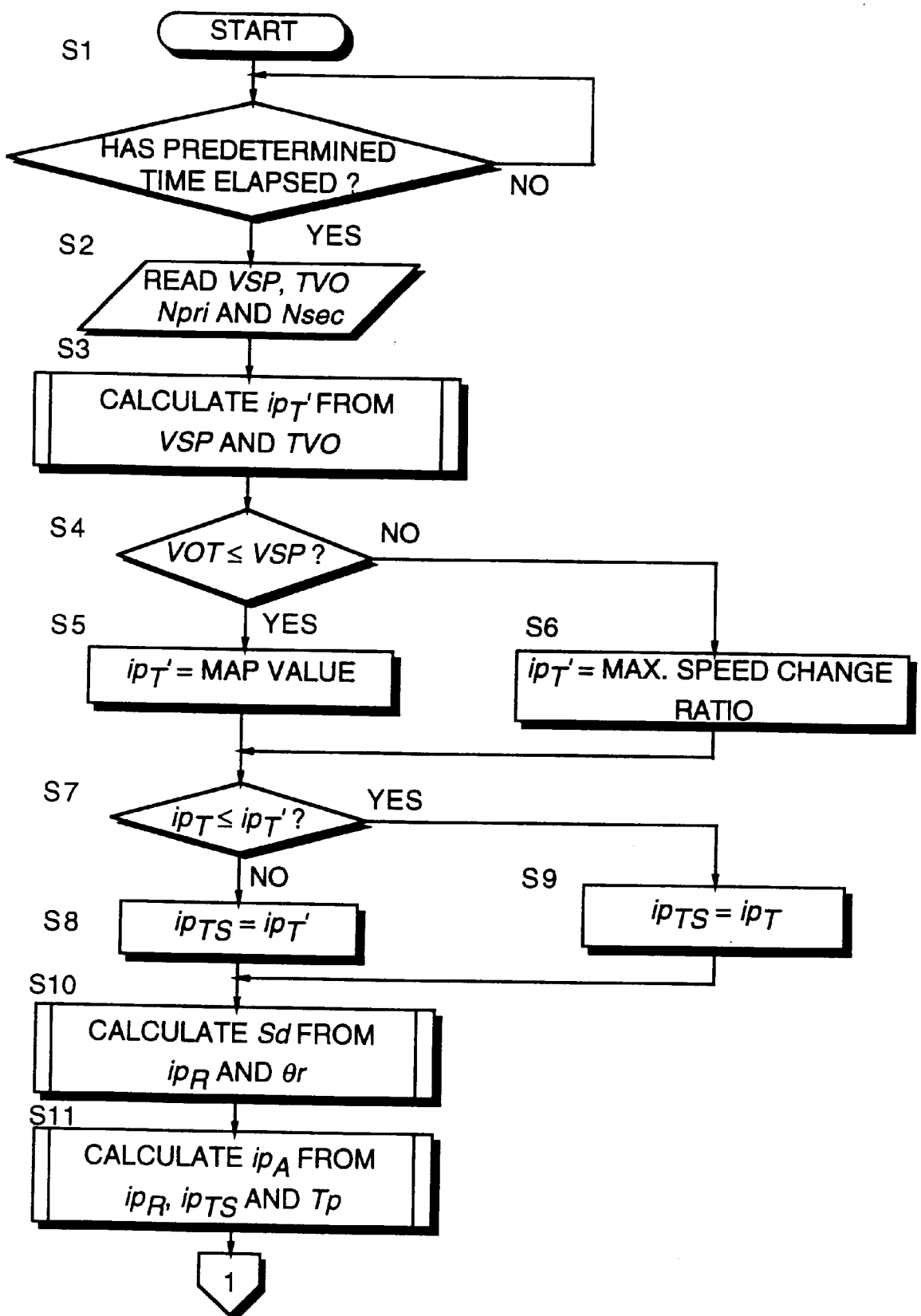
FIGS. 4A and 4B are flowcharts for describing a speed change control process performed by the electronic control unit.
Figure 4B:
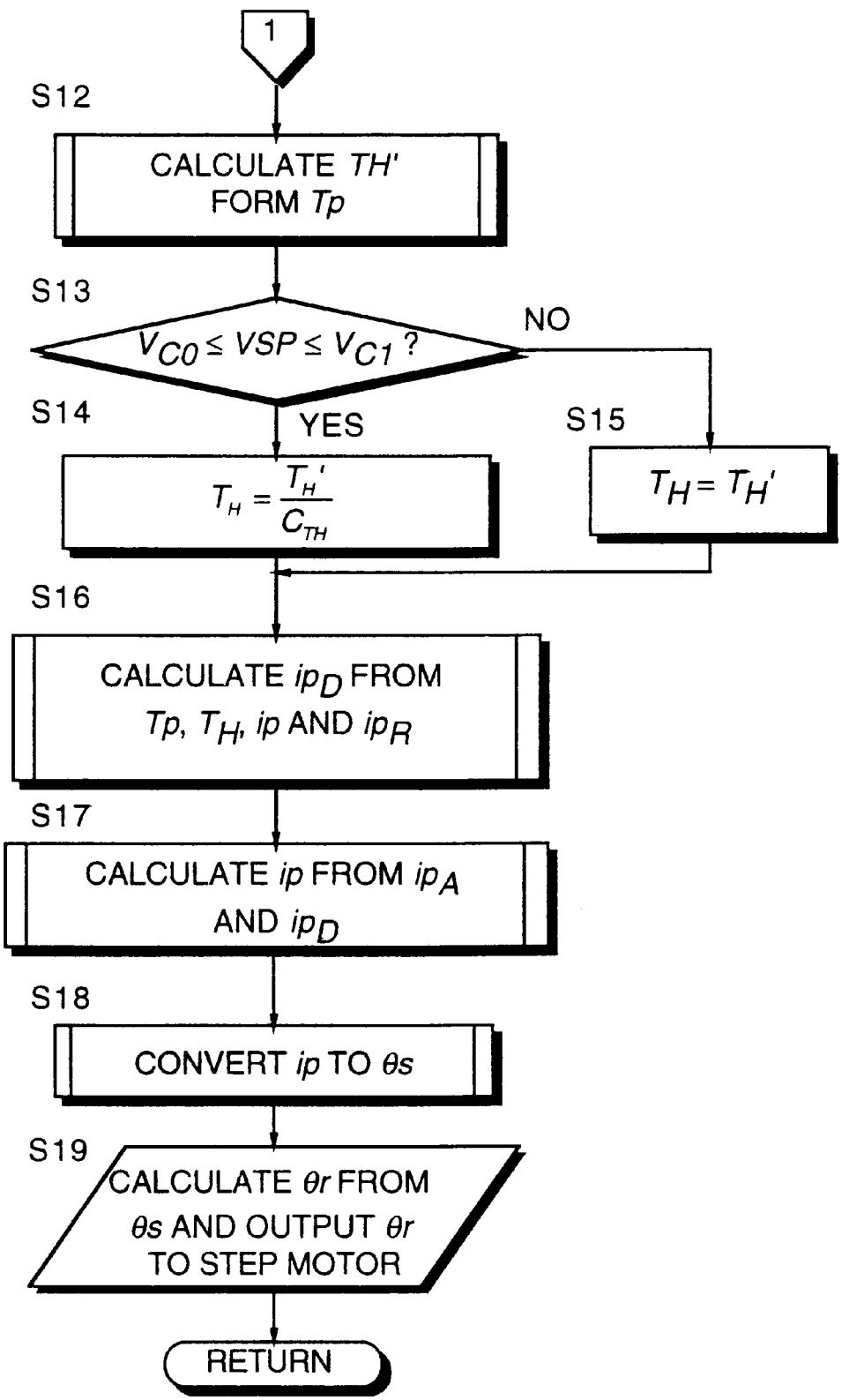

The electronic control unit 1 comprises a microcomputer, and is provided with a target speed change ratio computing unit 410, real speed change ratio computing unit 460, temporary target speed change ratio command unit 450 and speed change command unit 420 as shown in the block diagram of FIG. 3.

The target speed change ratio computing unit 410 estimates the running state of the vehicle and calculates a target speed change ratio $ip_T$ based on the vehicle speed VSP, engine rotation speed Ne, throttle opening TVO, shift position and a signal from an idle switch. This calculation is performed by referring to a map which sets a target engine rotation speed according to the throttle opening TVO and vehicle speed VSP. This process is shown for example in Tokkai Sho 59-217047 published by the Japanese Patent Office in 1984.

The real speed change ratio computing unit 460 calculates a real speed change ratio $ip_R$ from the a vehicle speed VSP and a drive pulley rotation speed Npri. A connection direction value Sd of the speed change control valve 63 is also computed from the real speed change ratio $ip_R$ and an angular position command value θr of the step motor 64. The connection direction value Sd specifies whether a drive pulley cylinder chamber 20 is connected to a line pressure or to a drain. When it is connected to line pressure, the speed change ratio varies in the decreasing direction (speed increase direction), and when it is connected to the drain, the speed change ratio varies in the increasing direction (speed decrease direction).

When the vehicle speed VSP becomes equal to or greater than a preset vehicle speed $V_{OT}$, the temporary target speed change ratio command unit 450 sets a temporary target speed change ratio $ip_T{'}$ from a value corresponding to the starting point of the step motor 64 to a predetermined value corresponding to a position slightly shifted towards decreasing speed change ratio.

The speed change command unit 420 is provided with a dynamic characteristic estimating unit 444, target speed change ratio change -over unit 490, lowpass filter time constant computing unit 436, external disturbance compensating unit 430, dynamic characteristic compensating unit 440, adder 465, speed change ratio command value converting unit 470 and step motor angular position adjusting unit 480.

In the speed change command unit 420, the angular position command value θr of the step motor 64 is calculated so that the real speed change ratio $ip_R$ follows the target speed change ratio with a preset response based on the aforesaid target speed change ratio $ip_T$, temporary target speed change ratio $ip_T{}'$, real speed change ratio $ip_R$ and connection direction value Sd.

The dynamic characteristics $G_P(S)$ of the CVT 17 can be represented by the following equation (1) using a first-order lag and dead-time.

$$G_p(s) = \frac{kp \cdot (ip_R)}{Tp(ip_R, Sd) \cdot s + 1} \cdot \exp(-Ls) \qquad (1)$$

where, $kp^*(ip_R)$=a gain of the CVT 17 to correct for the fact that the step motor angular position and speed change ratio are not in direct proportion,
$Tp(ip_R, Sd)$=time constant of CVT 17,
L=dead-time of CVT 17,
s=Laplacian operator.

These dynamic characteristics $G_P(s)$ are first found by experiment, and are stored in the CVT control unit 1 as a map shown in FIG. 5. This map sets the time constant Tp for shift-up and for shift-down. The dynamic characteristic estimating unit 444 calculates the time constant Tp of the CVT 17 from the real speed change ratio $ip_R$ and connection direction value Sd by referring to this map.

The target speed change ratio change-over unit 490 compares the target speed change ratio $ip_T$ with the value of the temporary target speed change ratio $ip_T{}'$, and outputs the lesser of the two as a target speed change ratio determination value $ip_{TS}$.

The dynamic characteristic compensating unit 440 computes an output value $ip_A$ based on the following equations (2)–(6) so that the real speed change ratio $ip_R$ follows the target speed change ratio determination value $ip_{TS}$ with the preset dynamic characteristics $G_T(s)$.

$$G_T(s) = \frac{1}{T_T \cdot s + 1} \cdot \exp(-L \cdot s) \qquad (2)$$

$$ip_{AF}(t) = \frac{T_{FB} \cdot s + 1}{T_T \cdot s + 1} \cdot ip_{TS}(t) \qquad (3)$$

$$C_1 = \frac{Tp}{T_{FB}} \qquad (4)$$

$$C_2 = \frac{Tp}{T_{FB}} - 1 \qquad (5)$$

$$ip_A = C_1 \cdot ip_{AF} - C_2 \cdot ip_R \qquad (6)$$

where, $T_T$=time constant corresponding to preset response,
$T_{FB}$=time constant corresponding to target response.

The lowpass filter time constant computing unit 436 determines a time constant $T_H$ of the lowpass filter of the external disturbance compensating unit 430, i.e. a cut-off frequency, from the time constant Tp calculated by the dynamic characteristic estimating unit 444.

First, a time constant $T_H{}'$ is computed in order to ensure stability of the speed change ratio control system so as to obtain a gain margin of at least 12[dB] and a phase margin of at least 45 degrees.

This constant $T_H{}'$ is then corrected as follows based on the vehicle speed VSP and an arbitrary correction coefficient $C_{TH}$.

When $V_{C0} \leq VSP \leq V_{C1}$, (7)

$$T_H = \frac{T_H{}'}{C_{TH}}$$

and when $VSP < V_{C0}$ or $V_{C1} < VSP$, (8)

$$T_H = T_H{}'$$

$V_{c0}$ and $V_{c1}$, are set for example to 5 Km/hr and 10 Km/hr. The correction constant $C_{TH}$ is a value less than 1. As a result, the time constant $T_H$ is increased when the vehicle speed VSP lies within the range of 5 Km/hr to 10 Km/hr compared to when it lies outside this range.

The external disturbance compensating unit 430 is designed to eliminate parameter fluctuations due to oil viscosity changes or scatter in performance due to mass production and the effect of external disturbances taking the dynamic characteristics of the CVT 17 represented by equation (1) as a reference model. The external disturbance compensating unit is known from Tokkai Hei 8-296708 and Tokkai Hei 9-280332 respectively published by the Japanese Patent Office in 1996 and 1997.

The external disturbance compensating unit 430 computes an output value $ip_D$ based on the following equation (9) from the aforesaid real speed change ratio $ip_R$, time constant Tp of the CVT 17, lowpass filter time constant $T_H$ and a speed change ratio command value ip described hereafter.

$$ip_D(t) = \frac{T_H \cdot s + 1}{T_p \cdot s + 1} \cdot ip_R(t) - \frac{1}{T_H \cdot s + 1} \cdot \exp(-L \cdot s) \cdot ip(t) \qquad (9)$$

The first term in equation (9) is calculated by a first external disturbance output compensating unit 432, and the second term is calculated by a second external disturbance output compensating unit 434.

An adder 465 computes a speed change ratio command value ip by the following equation (10) from the aforesaid output value $ip_A$ of the dynamic characteristic compensating unit 440 and the output value $ip_D$ of the external disturbance compensating unit 430.

$$ip = ip_A - ip_D \qquad (10)$$

By using the speed change ratio command value ip computed in equation (10), a speed change ratio response according to a design value can be obtained unaffected by changes of parameters due to dimensional errors in parts or by external disturbance.

A speed change ratio command value converting unit 470 converts the speed change ratio command value ip into a step motor angular position command value θs. This step motor angular position command value θs is equivalent to a stroke amount of the spool of the speed change control valve 63.

A step motor angular position adjusting unit 480 adjusts the maximum value of the angular velocity of the step motor 64 according to the response characteristics of the step motor 64 such that the step motor angular position command value θs and real angular position θ of the step motor 64 coincide. The value adjusted by the step motor angular position adjusting unit 480 is output as an angular position command value θr to the step motor 64.

Herein, let the adjustment positions due to a stopper 95 in the vicinity of a minimum speed change ratio and a maximum speed change ratio be $\theta_H$, $\theta_L$ as shown in FIGS. 6–9. Also, let the positional displacement, i.e. ineffectual angular position variation amount of the step motor 64, ranging from an actual speed change start position corresponding to the minimum speed change ratio, to the adjustment position $\theta_H$, be denoted as $D_{SH}$. Further, let the positional displacement, i.e. ineffectual angular position variation amount of the step motor 64, ranging from an actual speed change start position corresponding to the maximum speed change ratio, to the adjustment position $\theta_L$, also be denoted as $D_{SH}$.

Due to this setting, the groove interval Ds of the drive pulley 16, speed change ratio ip and relation between values pertaining to the drive pulley 16 and driven pulley 26 may be expressed by the following equations (11)–(13).

$$r_1 = \frac{Ds}{2 \cdot \tan\beta} + r_{10} \quad (11)$$

$$r_0 = 2 \cdot r_1 - \pi \cdot Dc + \frac{\sqrt{(2 \cdot r_1 - \pi \cdot Dc)^2 - 4 \cdot \{r_1^2 + \pi \cdot Dc \cdot r_1 + Dc \cdot (2 \cdot Dc - L_B)\}}}{2} \quad (12)$$

$$ip = \frac{r_0}{r_1} \quad (13)$$

where, $r_1$=radius of belt contact part of drive pulley,
$r_{10}$=minimum radius of belt contact part of drive pulley,
$r_0$=radius of belt contact part of driven pulley,
Ds=variation amount from minimum radius equivalent value of groove width of drive pulley (=angular position of step motor),
Dc=distance between drive pulley and driven pulley,
LB=belt circumference,
$\beta$=primary pulley groove angle.

When the vehicle is at rest, it is desirable that oil pressure does not act on the drive pulley 16 and driven pulley 26. Therefore, when the vehicle is at rest, the angular position $\theta$ of the step motor 64 must be set to the position corresponding to the maximum speed change ratio. However, the scatter in the speed change start position, i.e. the position in which oil pressure required for speed change starts to act on the drive pulley 16 and driven pulley 26, due to dimensional errors during manufacture of parts such as the spool, is an interval $\theta_0$–$\theta_1$ centered on the step motor design start value $\theta_N$ when the vehicle is at rest, as shown in FIGS. 7 and 8.

Figure 7:
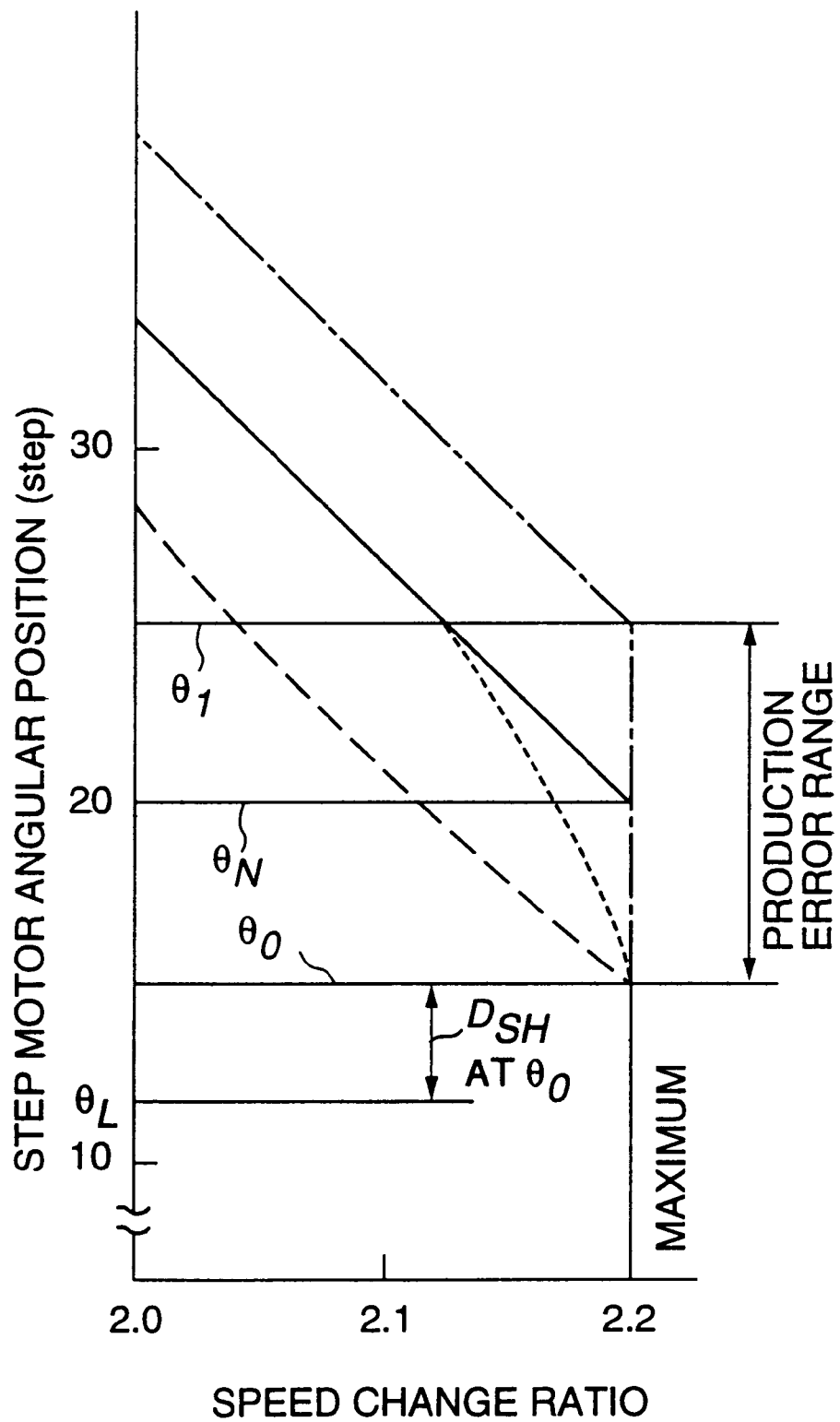
FIG. 7 is an enlarged view of an essential part in FIG. 6.

Hence the relation between angular position and speed change ratio is set so that the speed change ratio gradually varies from a maximum at the angular position $\theta_0$ to a speed change ratio at the angular position $\theta_1$, as shown by the broken line in FIG. 7, once the vehicle has started.

Figure 8:
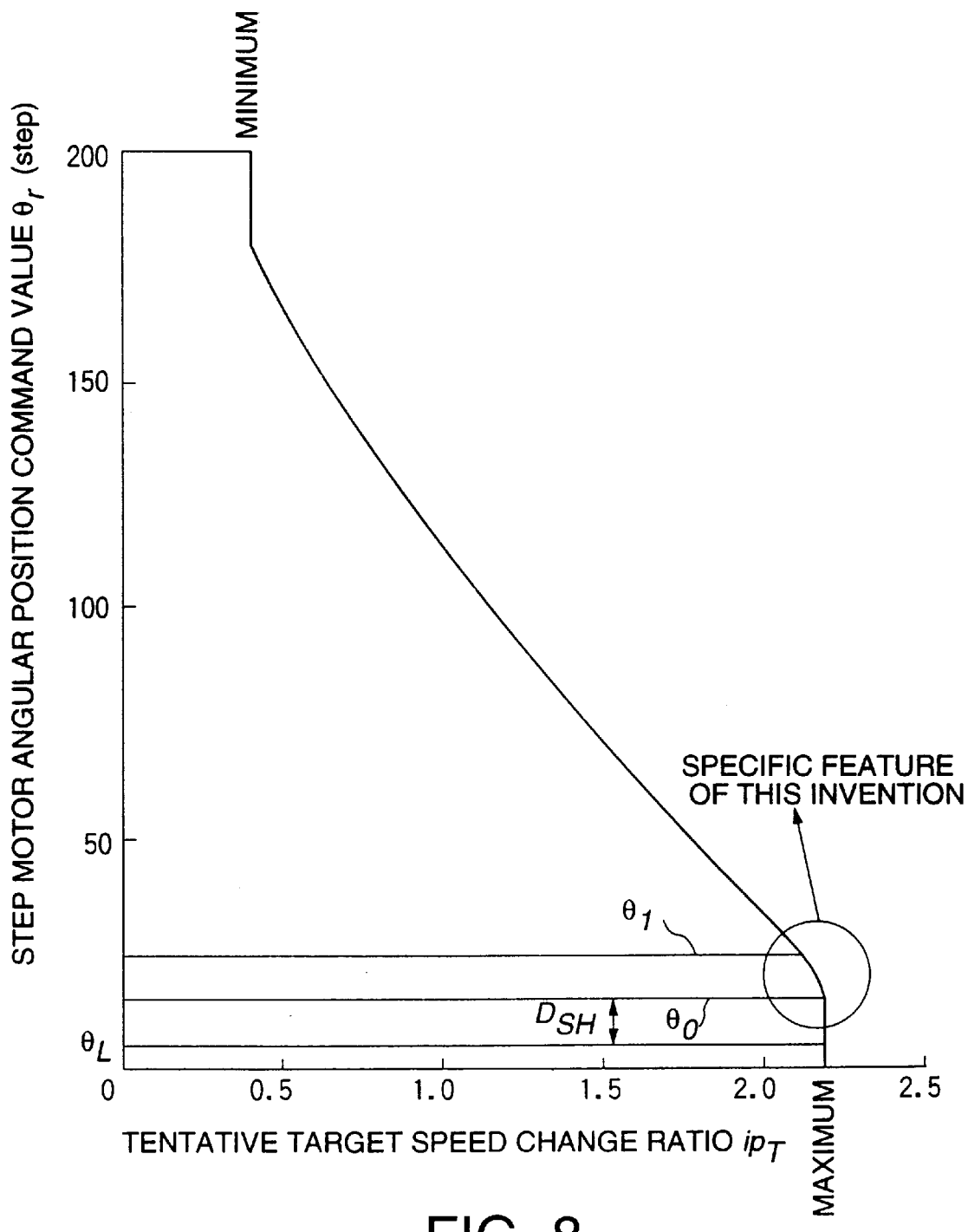
FIG. 8 is a diagram showing the contents of a map of step motor angular position θ stored by the electronic control unit.

Specifically, a map shown in FIG. 8 is stored in the CVT control unit 1, and the step motor angular position command value $\theta r$ is found from the speed change ratio command value ip by looking up this map.

In this way, the speed change ratio can be varied according to the step motor angular position even within the interval $\theta_0$–$\theta_1$ once the vehicle has started, while oil pressure is prevented from acting on the drive pulley 16 and driven pulley 26 when the vehicle is at rest.

The aforesaid speed change ratio control process performed by the electronic control unit 1 will now be described referring to the flowcharts of FIGS. 4A and 4B.

First in a step S1, a predetermined time from startup is waited, and in a step S2, the drive pulley rotation speed Npri, driven pulley rotation speed Nsec (=vehicle speed VSP), throttle opening TVO and shift position signal from an inhibitor switch 8 are read.

In a step S3, a target speed change ratio $ip_T$ depending on the vehicle speed VSP is looked up from a preset map with the throttle opening TVO as a parameter. The processing of this step S3 corresponds to the aforementioned target speed change ratio computing unit 410.

In a step S4, it is determined whether or not the vehicle speed VSP is equal to or greater than a preset vehicle speed $V_{OT}$. When the vehicle speed VSP is equal to or greater than the preset value $V_{OT}$, a map having the contents shown by the broken line in FIG. 8 is looked up in a step S5 based on the latest angular position command value $\theta r$ of the step motor 64, and a temporary target speed change ratio $ip_T'$ is set. As a result, the temporary target speed change ratio $ip_T'$ gradually decreases from a maximum speed change ratio according to increase of the angular position command value $\theta r$. The temporary target speed change ratio $ip_T'$ is equivalent to the broken line in FIG. 7, and when the angular position command value $\theta r$ is equal to or greater than a predetermined value, the temporary target speed change ratio $ip_T'$ becomes equal to the target speed change ratio ip.

When the vehicle speed VSP is less than the set value $V_{OT}$, the temporary target speed change ratio $ip_T'$ is set to the maximum speed change ratio in a step S6. $V_{OT}$ is set for example to 5 km/hr. The processing of the steps S4–S6 corresponds to the aforesaid temporary target speed change ratio command unit 450.

In a step S7, the target speed change ratio $ip_T$ found in the step S3 is compared with the temporary target speed change ratio $ip_T'$ found in the step S5 or step S6, and the lesser of the two speed change ratios is set equal to a target speed change ratio determination value $ip_{TS}$ in steps S8 and S9. The processing of the steps S7–S9 corresponds to the aforementioned target speed change ratio change-over unit 490.

Due to this, when the vehicle is at rest, the speed change ratio characteristic shown by the solid line of FIG. 7 is applied as in the prior art, whereas after the vehicle has started running, the speed change ratio characteristic shown by the broken line of FIG. 7 is applied.

In other words, when the vehicle is at rest, oil pressure acts neither on the drive pulley 16 nor the driven pulley 26, and the durability of the CVT 17 is not impaired. Further, after the vehicle has started running, even when the step motor angular position is in the range of $\theta_0$–$\theta_1$, the speed change ratio varies according to the step motor angular position.

In a step S10, the real speed change ratio $ip_R$ is computed from the driven pulley rotation speed Nsec and drive pulley rotation speed Npri, and the connection direction value Sd of the speed change control valve 63 is computed from this real speed change ratio $ip_R$ and the latest angular position command value $\theta r$ of the step motor 64. The processing of the step S10 corresponds to the aforesaid real speed change ratio computing unit 460.

In a step S11, the output value $ip_A$ is computed by the aforesaid equations (2)–(6) from the target speed change ratio determination value $ip_{TS}$, real speed change ratio $ip_R$, connection direction value Sd and time constant Tp found from the time constant map shown in FIG. 5 This processing corresponds to the aforementioned dynamic characteristic compensating unit 440.

In a step S12, the time constant $T_H'$ of the lowpass filter of the external disturbance compensating unit 430 is calculated based on the time constant TP.

In a step S13, it is determined whether or not the vehicle speed VSP lies within a predetermined vehicle speed range $V_{C0}$–$V_{C1}$.

When the vehicle speed VSP lies within this range, in a step S14, the time constant $T_H'$ is increased and the time constant $T_H$ of the lowpass filter is determined by the aforesaid equation (7). When the vehicle speed VSP lies outside this range, in a step S15, the time constant $T_H'$ is applied without modification to the lowpass filter time constant $T_H$ by the aforesaid equation (8). The processing of the steps S12–S14 corresponds to the lowpass filter time constant computing unit 436.

When the lowpass filter time constant $T_H$ is increased in the equation (9), the output value $ip_D$ also increases. As a result, the speed change command value ip obtained in equation (10) decreases. In other words, by increasing the time constant of the lowpass filter in a predetermined speed region, the speed change characteristic in the vicinity of the maximum speed change ratio when the vehicle has started can be decreased to less than the maximum speed change ratio according to the step motor angular position command value θr as shown by the broken line of FIG. 7.

In a step S16, the output value $ip_D$ is computed by the aforesaid equation (9) from the real speed change ratio $ip_R$, time constant Tp of the CVT 17, lowpass filter time constant $T_H$ and speed change ratio command value ip on the immediately preceding occasion when the process was executed. The step S16 corresponds to the aforesaid external disturbance compensating unit 430.

In a step S17, the speed change ratio command value ip is computed by the aforesaid equation (10) from the output values $ip_D$ and $ip_A$. The step S17 corresponds to the adder 465.

In a step S18, the speed change ratio command value ip is converted into the step motor angular position θs based on the map of FIG. 8. The step S18 corresponds to the aforesaid speed change ratio command value converting unit 470.

Finally, in a step S19, the step motor angular position θs is limited so that the step motor angular speed is equal to or less than a predetermined value according to the response characteristics of the step motor 64, and the processed value is output as the step motor angular position command value θr. The step S18 corresponds to the aforesaid step motor angular position adjusting unit 480.

Figure 9:
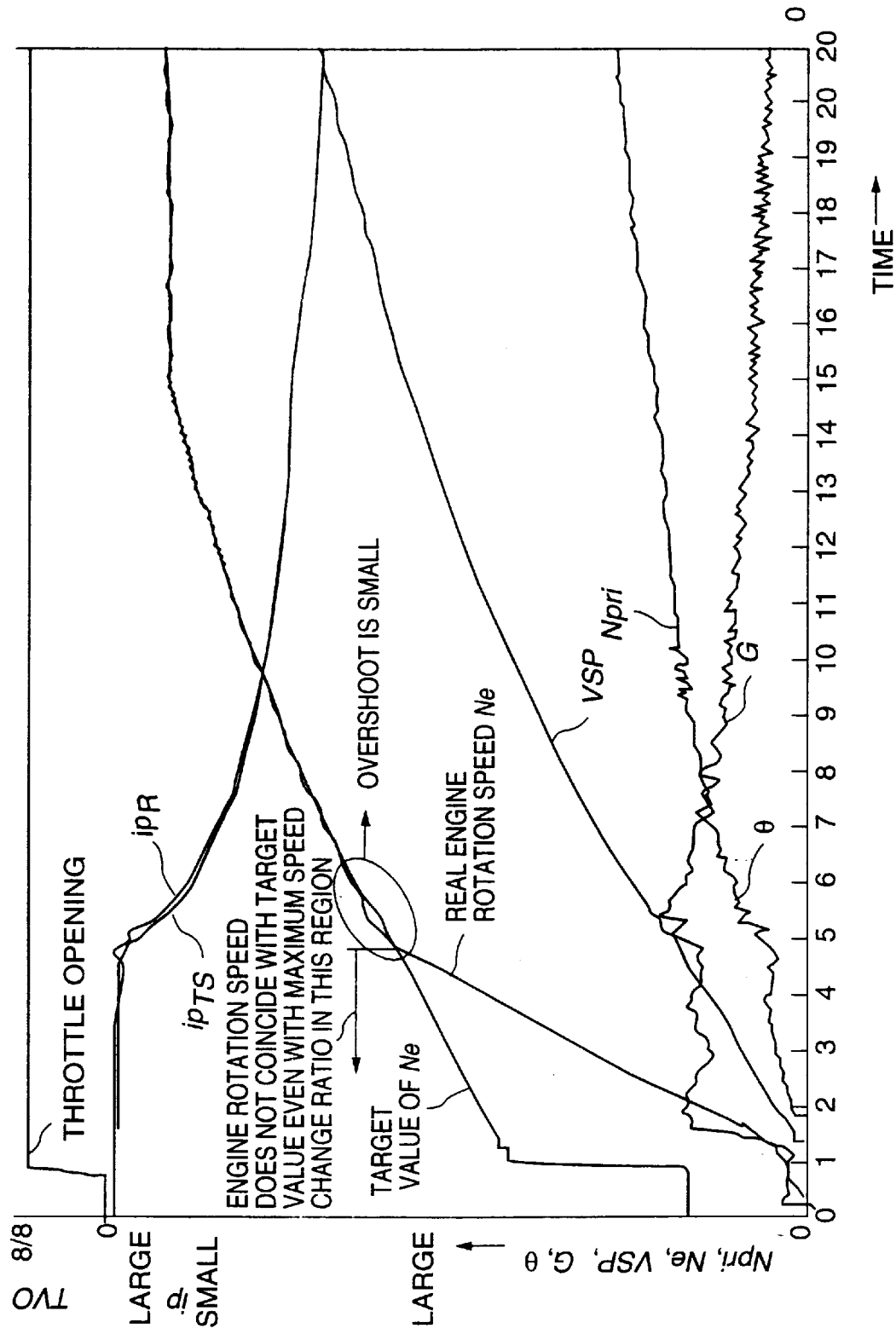
FIG. 9 is a timing chart showing a change of target speed change ratio ip, real speed change ratio $ip_R$, target engine rotation speed, real engine rotation speed Ne, vehicle speed VSP and acceleration G according to the speed change ratio controller.

Due to the above process, the speed change ratio can be varied smoothly from the maximum speed change ratio when the vehicle starts regardless of dimensional errors in parts, while oil pressure is prevented from acting on the CVT17 when the vehicle is at rest. As a result, a sharp variation of acceleration G due to the starting of the vehicle starts is mitigated. Further, as shown in FIG. 9, overshoot relative to the target engine rotation speed of the real engine rotation speed Ne (=drive pulley rotation speed Npri) is also reduced.

It should be noted that in this embodiment, the speed change ratio is varied according to the step motor angular position command value θr in the vicinity of the maximum speed change ratio when the vehicle has started by setting the temporary target speed change ratio $ip_T'$ in the step S5 and increasing the time constant $T_H$ in the step S14. However, the object of this invention may be achieved by either of these means alone.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

1. A speed change ratio controller for a continuously variable transmission for continuously varying a rotation speed of an engine of a vehicle via an actuator and transmitting a varied rotation to a vehicle drive shaft, comprising:
    a sensor for detecting a running state of the vehicle,
    a sensor for detecting a real speed change ratio of said transmission,
    a sensor for detecting a vehicle speed, and
    a microprocessor programmed to:
        set a target speed change ratio from said running state,
        set a temporary target speed change ratio smaller than a largest speed change ratio of said transmission,
        compute a dynamic characteristic estimated value of said continuously variable transmission for each speed change ratio,
        calculate a speed change ratio output value based on said dynamic characteristic estimated value and the lesser of said target speed change ratio and said temporary target speed change ratio when the vehicle speed is equal to or greater than a predetermined speed,
        compute an external disturbance compensating value under a predetermined time constant based on a speed change ratio command value, said real speed change ratio and said dynamic characteristic estimated value,
        calculate said speed change ratio command value based on said speed change ratio output value and said external disturbance compensating value,
        compute an operating command value of said actuator according to said speed change ratio command value, and
        control said actuator based on said operating command value.

2. A speed change ratio controller as defined in claim 1, wherein said microprocessor is further programmed to set said target speed change ratio to said largest speed change ratio when said operating command value is less than a predetermined first reference value, and set said temporary target speed change ratio so that said temporary target speed change ratio gradually decreases as said operating command value increases when said operating command value is equal to or larger than said predetermined first reference value.

3. A speed change ratio controller as defined in claim 2, wherein said microprocessor is further programmed to set said temporary target speed change ratio to be equal to said largest speed change ratio when said vehicle speed is lower than said predetermined speed.

4. A speed change ratio controller as defined in claim 2, wherein said microprocessor is further programmed to set said temporary target speed change ratio to gradually decrease from said largest speed change ratio as said operating command value increases, when said vehicle speed is equal to or greater than said predetermined speed.

5. A speed change ratio controller as defined in claim 4, wherein said microprocessor is further programmed to set temporary target speed change ratio to be equal to said target speed change ratio when said operating command value is equal to or greater than a predetermined second reference value which is larger than said first predetermined reference value.

6. A speed change ratio controller as defined in claim 1, wherein said microprocessor is further programmed to compute a different operating command value when said speed change ratio is increasing and when said speed change ratio is decreasing.

7. A speed change ratio controller for a continuously variable transmission for continuously varying a rotation speed of an engine of a vehicle via an actuator and transmitting a varied rotation to a vehicle drive shaft, comprising:

a sensor for detecting a running state of the vehicle, a sensor for detecting a real speed change ratio of said continuously variable transmission, a sensor for detecting a vehicle speed, and a microprocessor programmed to:

set a target speed change ratio from said running state, compute a dynamic characteristic estimated value of said continuously variable transmission for each speed change ratio, calculate a speed change ratio output value based on said dynamic characteristic estimated value so that said real speed change ratio follows said target speed change ratio, determine whether or not the vehicle speed is within a predetermined speed range, set a time constant which has a larger value when the vehicle speed is within said predetermined speed range than when the vehicle speed is out of said predetermined speed range, compute an external disturbance compensating value under said time constant based on a speed change ratio command value, said real speed change ratio and said dynamic characteristic estimated value, calculate said speed change ratio command value based on said speed change ratio output value and said external disturbance compensating value, compute an operating command value of said actuator according to said speed change ratio command value, and control said actuator based on said operating command value.

8. A speed change ratio controller as defined in claim 7, wherein said predetermined speed range is from 5 km/hr to 10 km/hr.

9. A speed change ratio controller for a continuously variable transmission for continuously varying a rotation speed of an engine of a vehicle via an actuator and transmitting a varied rotation to a vehicle drive shaft, comprising:

a sensor for detecting a running state of the vehicle, a sensor for detecting a real speed change ratio of said transmission, a sensor for detecting a vehicle speed, means for setting a target speed change ratio from said running state, means for setting a temporary target speed change ratio smaller than a largest speed change ratio of said transmission, means for computing a dynamic characteristic estimated value of said continuously variable transmission for each speed change ratio, means for calculating a speed change ratio output value based on said dynamic characteristic estimated value and the lesser of said target speed change ratio and said temporary target speed change ratio when the vehicle speed is equal to or greater than a predetermined speed, means for computing an external disturbance compensating value under a predetermined time constant based on a speed change ratio command value, said real speed change ratio and said dynamic characteristic estimated value, means for calculating said speed change ratio command value based on said speed change ratio output value and said external disturbance compensating value, means for computing an operating command value of said actuator according to said speed change ratio command value, and means for controlling said actuator based on said operating command value.

* * * * *

UNITED STATES PATENT AND TRADEMARK OFFICE
CERTIFICATE OF CORRECTION

PATENT NO. : 6,055,474
DATED : April 25, 2000
INVENTOR(S) : Kazutaka ADACHI, et al..

It is certified that error appears in the above-indentified patent and that said Letters Patent is hereby corrected as shown below:

On the Title Page:

--[30]     Foreign Application Priority Data

- -April 8, 1997     Japan........................9-89496- -

Signed and Sealed this

Third Day of April, 2001

Attest:

NICHOLAS P. GODICI

*Attesting Officer*     Acting Director of the United States Patent and Trademark Office